United States Patent
Jain et al.

(10) Patent No.: US 7,483,424 B2
(45) Date of Patent: Jan. 27, 2009

(54) METHOD, FOR SECURELY MAINTAINING COMMUNICATIONS NETWORK CONNECTION DATA

(75) Inventors: Vinit Jain, Austin, TX (US); Robert Scott Manning, Leander, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 11/191,578

(22) Filed: Jul. 28, 2005

(65) Prior Publication Data

US 2007/0025239 A1 Feb. 1, 2007

(51) Int. Cl.
*H04L 12/28* (2006.01)
(52) U.S. Cl. .................................... 370/389; 370/392
(58) Field of Classification Search ................ 370/389, 370/392, 396, 230, 428, 471, 474, 475
See application file for complete search history.

(56) References Cited

U.S. PATENT DOCUMENTS

| | | | |
|---|---|---|---|
| 6,182,267 B1 * | 1/2001 | Kidd et al. | 714/807 |
| 6,205,551 B1 * | 3/2001 | Grosse | 726/25 |

2003/0229780 A1 12/2003 Reamer

FOREIGN PATENT DOCUMENTS

EP 0652519 A3 10/1995

OTHER PUBLICATIONS

Yue Feng; 'An Introduction To TCPDUMP; 1994-2006; China Academic Journal Electronic Publishing House.

* cited by examiner

*Primary Examiner*—Brenda Pham
(74) *Attorney, Agent, or Firm*—Dillon & Yudell LLP

(57) ABSTRACT

A method for securely maintaining communications network connection data is disclosed. According to one embodiment, a method is disclosed according to which a user is prompted for network element address substitution data which specifies a substitute network element address for a network element address associated with a network element of a first communications network. The network element address substitution data is then stored within a first storage element, wherein access to the first storage element outside of the first communications network is restricted. Connection monitor data associated with the first communications network is processed utilizing the network element address substitution data. According to the described embodiment, such connection monitor data processing includes identifying metadata of the connection monitor data which specifies the described network element address, and substituting the metadata with metadata which specifies the substitute network element address.

1 Claim, 6 Drawing Sheets

METHOD, FOR SECURELY MAINTAINING COMMUNICATIONS NETWORK CONNECTION DATA

BACKGROUND

1. Technical Field

Embodiments of the present invention relate generally to communications networks and more particularly to a method, system, and machine-readable medium for securely maintaining communications network connection data.

2. Description of the Related Art

As data processing systems have become more prevalent, so have the communications networks used to transfer data generated by, and provide communications between, such data processing systems. FIG. 1 illustrates one exemplary communications networks system according to the prior art and useable in conjunction with one or more embodiments of the present invention. Communications network system 100 as depicted in FIG. 1 includes a number of communications networks (e.g., communications networks 102A and 102B) coupled together and in communication with one another. In the illustrated system, for example, communications network 102A and communications network 102B each comprise local area networks (LANs) coupled together via a wide area (WAN) or metropolitan area (MAN) network (e.g., communications network 104 as shown). Communications networks 102A and 102B may be referred to interchangeably as "segments" within the present description.

Communications network 102A of communications network system 100 includes a number of network elements or "nodes" coupled together via a communications medium 106A. A network element or "node" may include any of a number of logical or physical devices coupled to a communications network such as server 108A or desktop computer system 110A, coupled directly to communications medium 106A, or alternatively such a device (e.g., personal digital assistant 112, tablet computer system 114, or notebook computer system 116) coupled to communications medium 106A via a wireless connection (e.g., wireless access point 118) as shown. A network element may also comprise logical or physical elements or devices provided at other functional or structural levels (e.g., a port, adapter, hub, router, gateway, bridge, application, protocol, protocol layer, or the like). While the previously described network elements all act primarily as terminal network elements (e.g., a "source" or a "sink" for data communications), communications network 102A additionally includes a forwarding communication element (e.g., router 120A) coupled to, and routing data communication between, communications network 102A, communications network 104, and ultimately communications network 102B.

Communications network 102B is similarly coupled to and in communication with communications networks 104 and 102A via a corresponding forwarding communication element (e.g., router 120B) and includes a communications medium 106B and one or more terminal network elements or "nodes" (e.g., server 108B and desktop computer system 110B). Communication between a terminal network element of communications network 102B (e.g., server 108B) and a terminal network element of communications network 102A (e.g., desktop computer system 110A) may be conducted via a path including, for example, communications medium 106B, router 120B, communications network 104, router 120A, and communications medium 106A.

In a conventional communications network system such as is illustrated in FIG. 1, data communications are conducted by transmitting data in a "packet" format. A packet is a unit of data which is routed between an origin or "source" and a destination terminal network element on a packet-switched communications network. In general, a packet includes metadata (e.g., a header) and data (sometimes referred to as a payload or payload data) in combination. The metadata of a packet indicates how the packet's data is to be transferred or routed from source to destination. Frequently, a header includes metadata identifying a destination communications network, network connection, or network element.

Packets may be transferred using a hierarchical communications protocol stack in which a packet may be encapsulated and/or de-encapsulated by various communications protocols during transmission through a communications network. In encapsulation, a packet (i.e., both the packet's metadata and data) formatted according to a first communications protocol is stored within or "encapsulated" as the data portion of another, larger packet, formatted according to a second (e.g., hierarchically lower level) communications protocol. In de-encapsulation, an inverse operation is performed in which data of a packet having a first communications protocol format is separated into metadata and data of a packet having a second (e.g., hierarchically higher level) communications protocol format. The use of such hierarchical communications protocol stacks provides the ability to abstract a given protocol stack layer from the viewpoint of its adjacent (or other) protocol layers as well as to provide a fixed interface.

In FIG. 2, an exemplary communications network packet, formatted hierarchically utilizing a number of communications protocols, according to the prior art and useable in conjunction with one or more embodiments of the present invention is illustrated. Consequently, the data and metadata depicted in FIG. 2 actually encompasses a number of packets as will be described. As illustrated in FIG. 2, each successive communications protocol layer adds metadata by prepending a header (and/or appending a trailer) to a packet received from an adjacent communications protocol layer. For instance, at an application protocol layer, an application header 204 is prepended to user data 202 to form application data 206. At a transport protocol layer, a transport protocol header is in turn prepended to application data 206. In exemplary packet 200 of FIG. 2, transport control protocol (TCP) transport protocol layer is used, and consequently, a TCP header 208 is prepended to application data 206, forming a TCP segment which may be provided to a hierarchically adjacent (network layer) protocol such as the Internet Protocol (IP).

At the network protocol layer, an IP header 210 is prepended to the described TCP segment, thus forming an IP datagram as shown. Finally, at a link protocol layer a media header such as Ethernet header 212 is prepended to the packet received from the network layer to form a communication network frame. In some instances, such as when the media is Ethernet, a media trailer may also be appended to packet data as shown. In the illustrated packet of FIG. 2, an Ethernet trailer 214 is shown appended to the combined data of Ethernet Header 212 and the described IP datagram to form an Ethernet frame. A trailer may include various types of data or metadata and in one instance includes checksum type data (e.g., a cyclical redundancy check value) used to validate the previously transmitted packet data and detect any errors introduced during transmission.

Each combination of metadata and data (e.g., Ethernet frame, IP datagram, TCP segment, or the like) therefore comprises a packet which may be encapsulated or de-encapsulated or "interpreted" by an adjacent protocol layer. In order to assess or analyze a communications network or component portion thereof (e.g., to diagnose a network problem or error, to improve throughput, reliability, or the like) packets transmitted across a communications network may be examined. A number of packet capture and/or analysis tools, software applications, or routines are commercially available. Such packet capture, analysis, and/or display tools include, for example, the iptrace daemon within the Advanced Interactive eXecutive (AIX) operating system provided by International Business Machines of Armonk, N.Y.; the tcpdump Unix command provided by the Lawrence Berkeley National Laboratory (LBNL) of Berkeley, Calif.; and the Packetyzer™ packet analysis interface or Ethereal network protocol analyzer provided under the GNU General Public License.

While such packet capture and analysis tools provide a means for improving communications network operations, the output generated by such tools may contain sensitive information. For example, such output may include actual user data (e.g., passwords, customer information, or the like) or metadata (e.g., hardware or media access control (MAC) addresses, IP addresses, private TCP ports, or the like) which may not be generally available outside of an associated communications network or enterprise. Where packet analysis is performed by an enterprise's internal (e.g., information technology) staff, this may not present a problem. Where captured packet data is to be sent outside of an enterprise or network for analysis (e.g., to diagnose a problem associated with a communications network) conventional packet capture and/or analysis programs provide no mechanism for easily obscuring such sensitive information in a manner which may be automatically performed and/or easily negated or reversed.

SUMMARY

A method for securely maintaining communications network connection data are provided herein. According to one embodiment, a method of securely maintaining communications network connection data is disclosed. According to the described method embodiment, a user is prompted for network element address substitution data which specifies a substitute network element address for a network element address associated with a network element of a first communications network. The network element address substitution data is then caused to be stored within a first storage element, wherein access to the first storage element outside of the first communications network is restricted. Connection monitor data associated with the first communications network is processed utilizing the network element address substitution data. According to the described embodiment, such connection monitor data processing includes identifying metadata of the connection monitor data which specifies the described network element address, and substituting the metadata with metadata which specifies the substitute network element address.

The foregoing is a summary and thus contains, by necessity, simplifications, generalizations and omissions of detail; consequently, those skilled in the art will appreciate that the summary is illustrative only and is not intended to be in any way limiting. As will also be apparent from the accompanying description, the operations disclosed herein may be implemented in a number of ways including implementation in hardware, software, firmware, or a combination thereof, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of similar reference symbols in different drawings is intended to indicate similar or identical items.

DETAILED DESCRIPTION OF AN ILLUSTRATIVE EMBODIMENT

Figure 1:
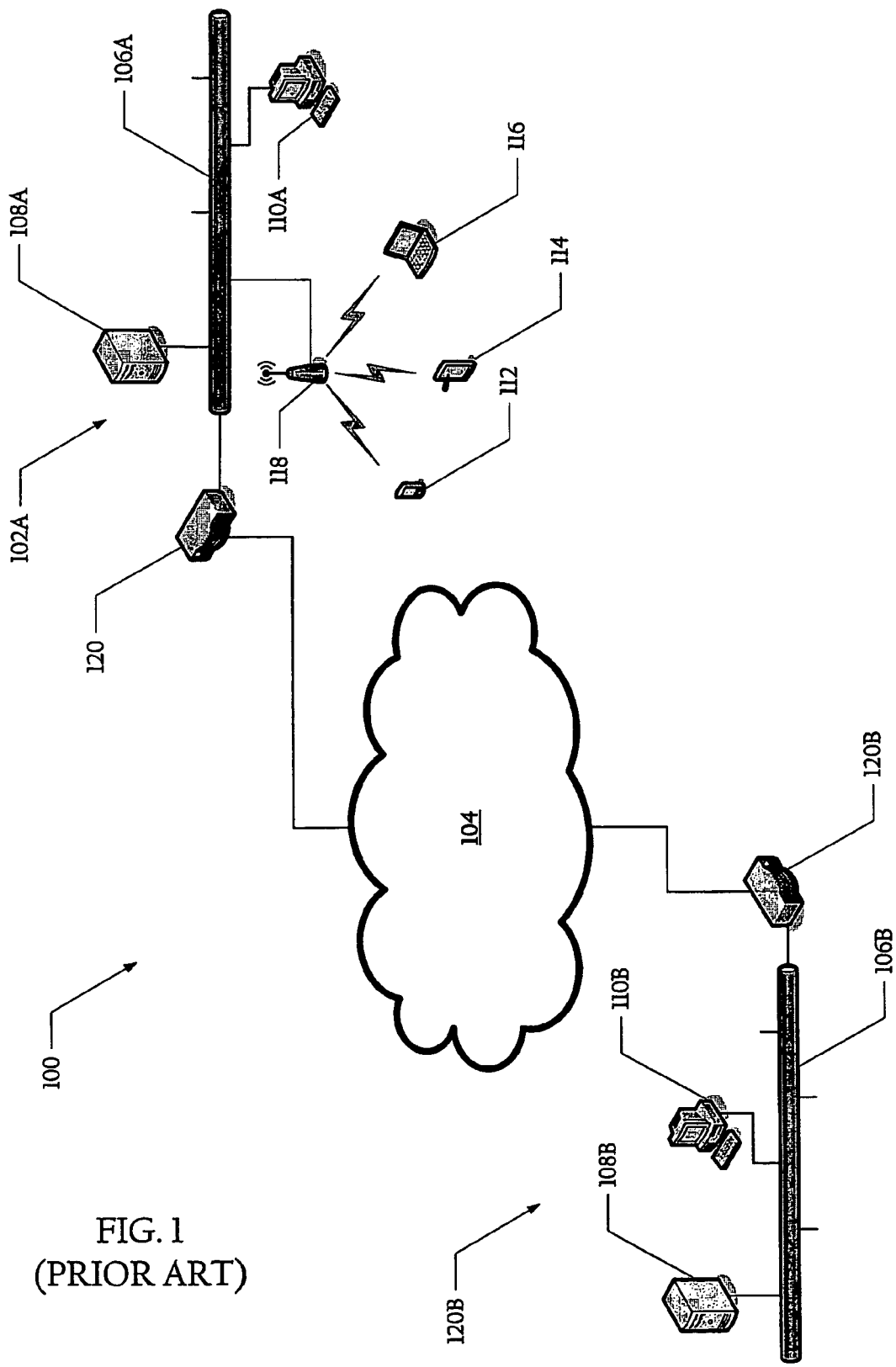
FIG. 1 depicts one exemplary communications network system according to the prior art and useable in conjunction with one or more embodiments of the present invention.

The following sets forth a detailed description of at least the best contemplated mode for carrying out the one or more systems, devices and/or processes described herein. The description is intended to be illustrative and should not be taken to be limiting.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring described invention embodiments.

References within the specification to "one embodiment," "an embodiment," or "embodiments" are intended to indicate that a particular feature, structure, operation, or characteristic described in connection with the embodiment is included in at least one embodiment of the present invention. The appearance of such phrases within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As previously described, embodiments of the present invention provide a method, system, and machine-readable medium for securely maintaining communications network connection data are provided herein. According to one embodiment, a method of securely maintaining communications network connection data is disclosed. Such communications network connection data may comprise any data describing a communications network connection (e.g., a link, segment, or any connection between network elements of one or more communications networks) or generated in conjunction with the operation of a communications network.

According to the described method embodiment, a user is prompted for network element address substitution data which specifies a substitute network element address for a network element address associated with a network element of a first communications network. A network element address, as described herein, may encompass any identifier utilized in association with a network element (e.g., a hardware or media access control (MAC) address, IP address, private TCP port, or the like). Such network element address substitution data may be stored utilizing any of a number of mechanisms (e.g., logical and/or physical storage elements, data structures, or the like). According to one embodiment, network element address substitution data is stored utilizing a table or array including a number of records, each record including an original network element address and a substitute network element address pair.

Such network element address substitution data may also be specified utilizing any of a number of physical input devices (e.g., a keyboard, mouse, trackball, light pen, touch screen, or other cursor control or text input devices, a microphone coupled with speech-recognition software, or the like). Similarly, any of a number of input procedures or techniques may be implemented. According to one embodiment of the present invention, network element address substitution data is provided by displaying a graphical depiction of a communications network to a user and subsequently accepting data specifying corresponding substitute network element addresses upon selection of each network element's graphical representation. In another embodiment of the present invention, a graphical or textual display of a table may be provided to a user which includes existing network element addresses and corresponding fields to accept substitute network element address data.

Once received, network element address substitution data is stored within a first storage element, wherein access to the first storage element outside of the first communications network is restricted. Such restriction may take any of a number of forms in various embodiments of the present invention and access to the first storage element (and consequently the network element address substitution data) may be restricted based upon any physical and/or logical parameters. For example, access to the first storage element may be restricted to users accessing network elements physically connected to the first communications network or within a particular physical proximity to the first communications network (e.g., to include those users accessing network elements coupled to the first communications network via a wireless access point). Alternatively or additionally, access to the first storage element may be restricted to users which have been logically associated with (e.g., authenticated and authorized by) the first communications network. Consequently, a principal or user of an enterprise associated with the first communications network and logging into the first communications network remotely may be enabled to access and manipulate the network element address substitution data as needed.

Connection monitor data associated with the first communications network may then be processed utilizing the stored network element address substitution data. Such connection monitor data may comprise any data which is generated by or on or may be utilized to monitor the state or condition of a communications network connection (e.g., raw packet transmission, capture, or trace data such as that generated by the previously-described packet capture, analysis, and/or display tools). According to one embodiment, the processing of connection monitor data includes identifying metadata (e.g., a portion of a packet header) of the connection monitor data which specifies the described network element address, and substituting therefore metadata which specifies the substitute network element address.

Figure 3:
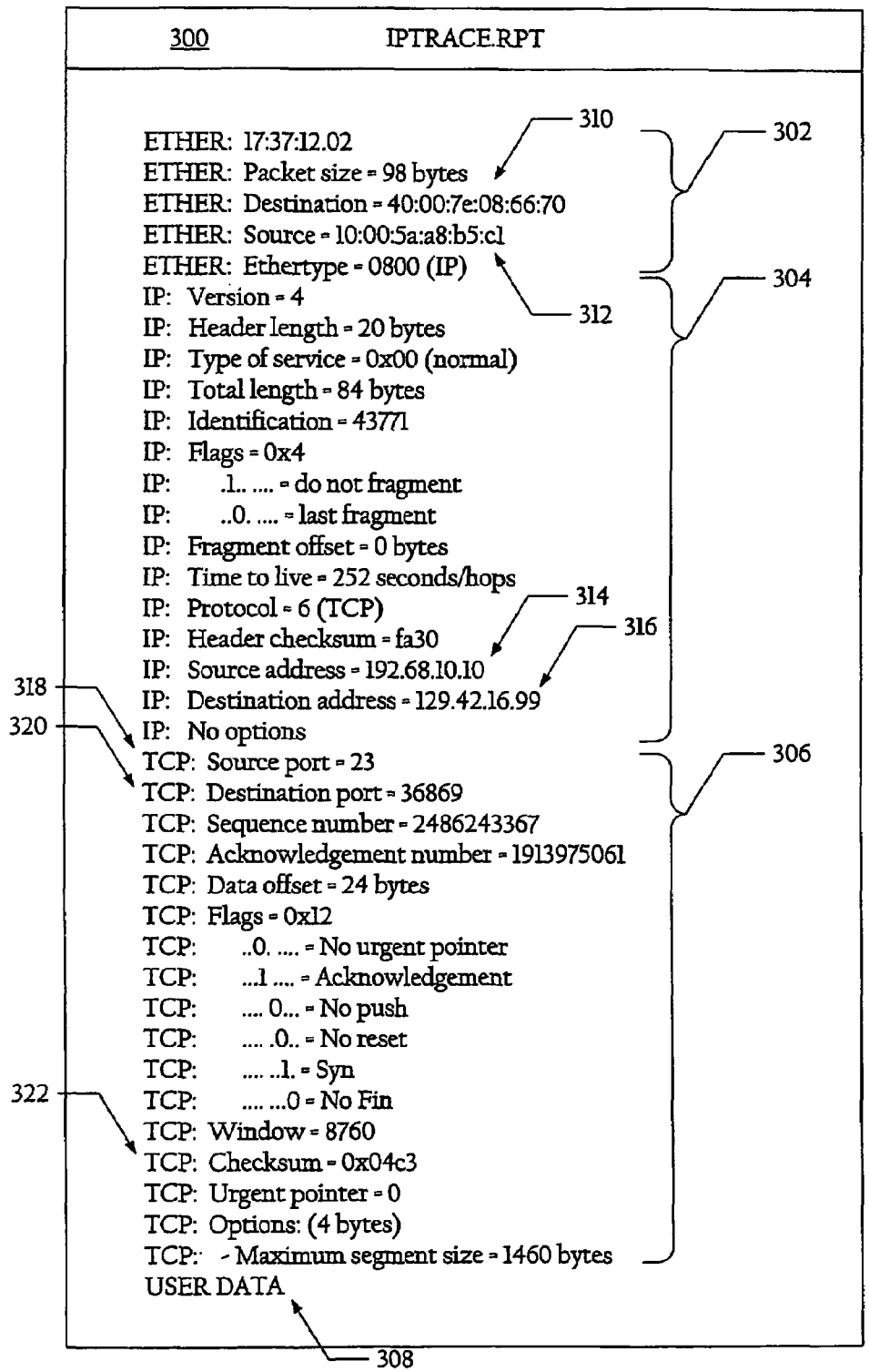
FIG. 3 depicts exemplary connection monitor data process input according to an embodiment of the present invention.

FIG. 3 depicts exemplary connection monitor data process input according to an embodiment of the present invention. IP trace connection monitor data of FIG. 3 is illustrated as being embodied within an iptrace daemon report file 300 "IPTRACE.RPT" as shown. In other embodiments of the present invention, such data may be embodied in other formats such as those generated by tcpdump. While data of a single packet has been illustrated herein for simplicity, such connection monitor data may include data corresponding to any number of packets. Report file 300 as depicted in FIG. 3 includes data link layer connection monitor data 302 (e.g., Ethernet data), network layer connection monitor data 304 (e.g., IP data), transport layer connection monitor data 306 (e.g., TCP data), and application or user data 308. More specifically, in the embodiment of FIG. 3, data link layer connection monitor data 302 includes destination (310) and source (312) hardware or media access control addresses, network layer connection monitor data 304 includes source (314) and destination (316) IP addresses, and transport layer connection monitor data 306 includes a source port 318, a destination port 320, and checksum data 322 as shown. An enterprise or user associated with a communications network from which data such as MAC addresses (310 and 312), IP addresses (314 and 316), TCP ports (318 and 320), and user/application data 308 may desire to keep such information private within the enterprise or network utilizing embodiments of the present invention described herein.

Figure 4:
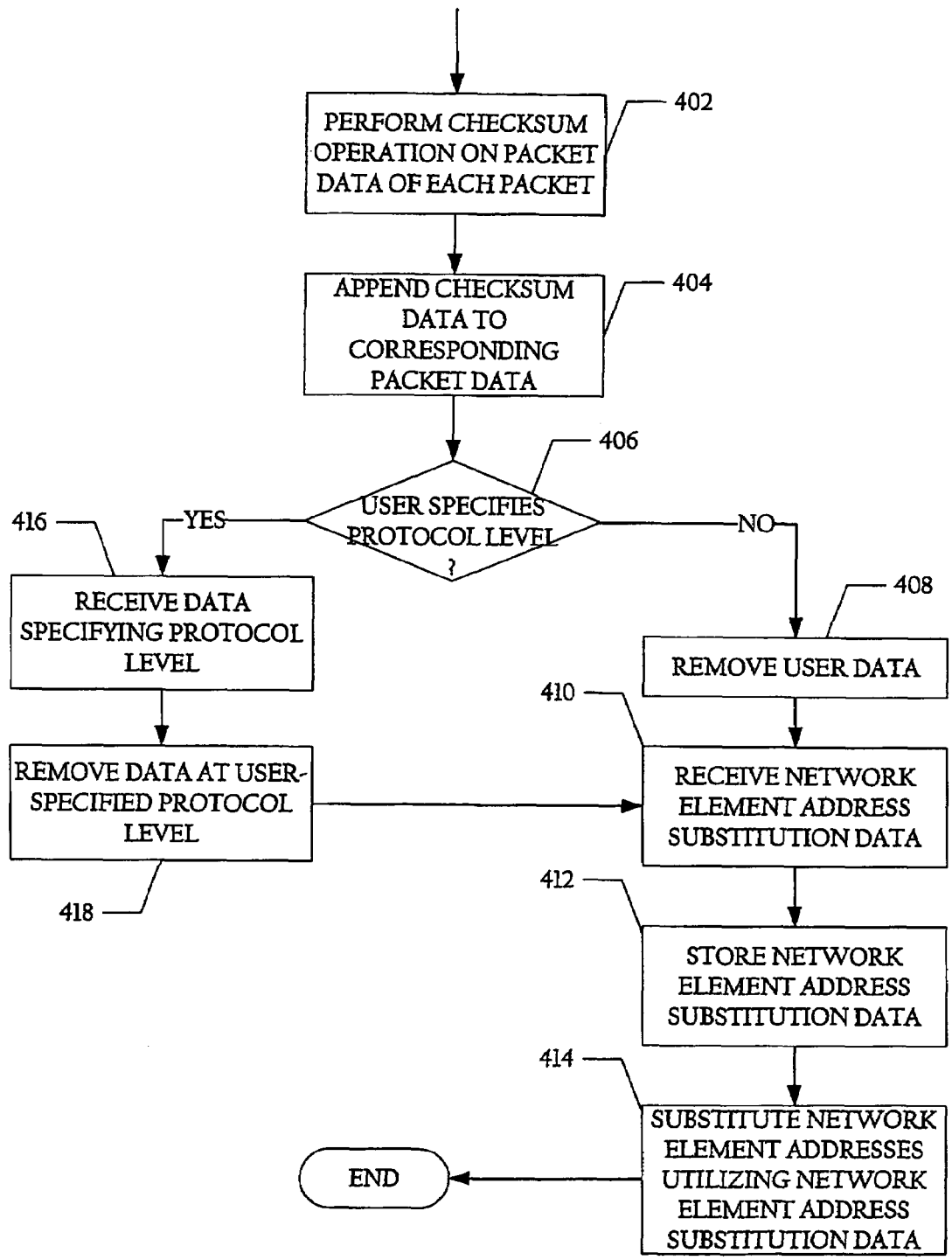
FIG. 4 illustrates a high-level flow diagram of a network element address substitution process according to an embodiment of the present invention.

FIG. 4 illustrates a high-level flow diagram of a network element address substitution process according to an embodiment of the present invention. Such an operational process may be embodied, in one embodiment, within a software application, routine, process, or the like stored within and executed from a machine-readable medium as will be described further herein. As packet data may be modified or removed by the illustrated process, altering a subsequent checksum determination, a checksum operation is initially performed on the packet data of each packet specified by or captured within a connection monitor data file (process block 402) such that any packet data errors may be detected and managed appropriately. While the flow diagram depicted in FIG. 4 indicated that all checksum operations are performed simultaneously, in alternative embodiments each packet of a connection monitor data file may be processed in a serial manner.

Generated checksum data is then appended to each corresponding packet (process block 404). According to one embodiment of the present invention, such checksum data may comprise a checksum operation result or value determined utilizing an associated checksum algorithm. In another embodiment, such checksum data may include data indicating or specifying whether or not an error was detected (e.g., a checksum valid indicator), generated for example, by comparing a checksum operation result or value as previously described with an expected checksum value (e.g., checksum data 322) stored within associated packet data.

Figure 2:
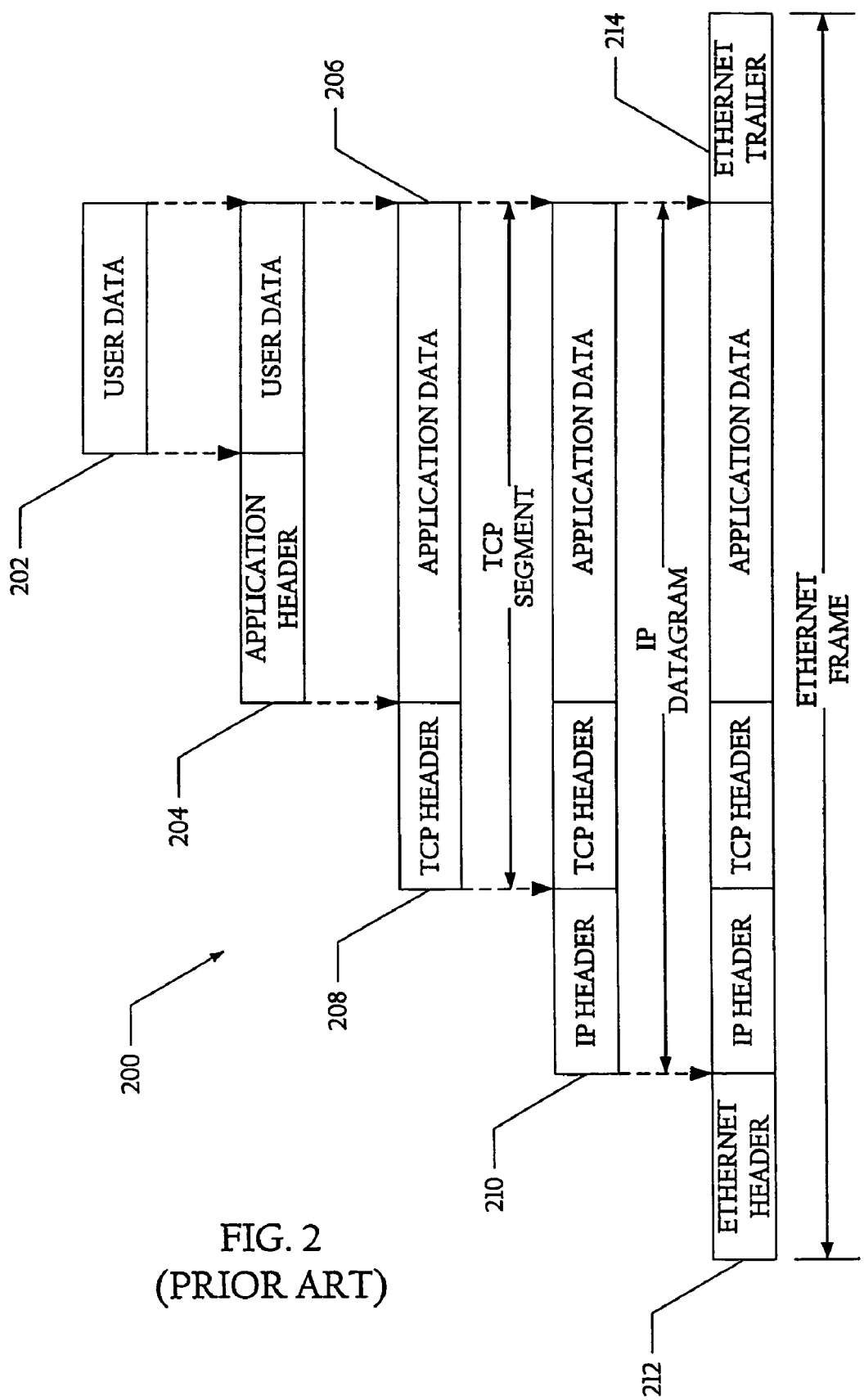
FIG. 2 illustrates an exemplary communications network packet formatted hierarchically via encapsulation according to a number of communications protocols according to the prior art and useable in conjunction with one or more embodiments of the present invention is illustrated.

Thereafter, a determination is made whether or not a user has specified a particular communications network protocol level at which data should be removed (process block 406). For example, a user may indicate that application layer data (e.g., application data 206 as depicted in FIG. 2) of a packet should be removed from a packet, thereby causing the removal of all metadata or headers of (hierarchically) higher layer communications network protocols (e.g., application header 204 as depicted in FIG. 2). Consequently, the (communications protocol) level or layer at which packet data is removed may be independently specified from the level(s) at which metadata (e.g., specifying network element addresses) is/are to be substituted utilizing embodiments of the present invention. If a determination is made that a "data-removal" protocol layer or level has been user-specified, data is then received specifying such a protocol level (process block 416) and packet data within the described connection monitor data file at the specified protocol level is removed or extracted (process block 418).

If a determination is made that no "data-removal" communication network protocol level has been specified, all "user" or application data (e.g., user data 202 as depicted in FIG. 2) may be removed from the packet data of each packet within the described connection monitor data file (process block 408). In an alternative embodiment, all packet data may be extracted or removed from a packet at the hierarchically highest communication network protocol layer or level at which corresponding metadata is substituted or modified where no data-removal protocol level is specified. Thereafter, or following the removal of packet data at a user-specified protocol level (process block 418) as previously described, network element address substitution data is received (process block 410) and stored (process block 412), for example, within a storage element of an associated communications network.

As previously described herein, in one embodiment of the present invention, network element address substitution data may be stored within a storage element to which access outside of an associated communications network is restricted. Once the described network element address substitution data has been stored, metadata specifying a network element address of associated with a packet of the described connection monitor data file is substituted with metadata specifying a substitute network element address utilizing the stored network element address substitution data (process block 414) as shown. Although the flow diagram depicted in FIG. 4 indicates a particular order of operation and a specific granularity of process operations, in alternative embodiments the illustrated orders may be varied (e.g., process operations may be performed in another order or performed substantially in parallel) and one or more of the process operations may be coalesced or fragmented. Similarly, addition process operations may be added where necessary in alternative embodiments of the present invention.

Figure 5:
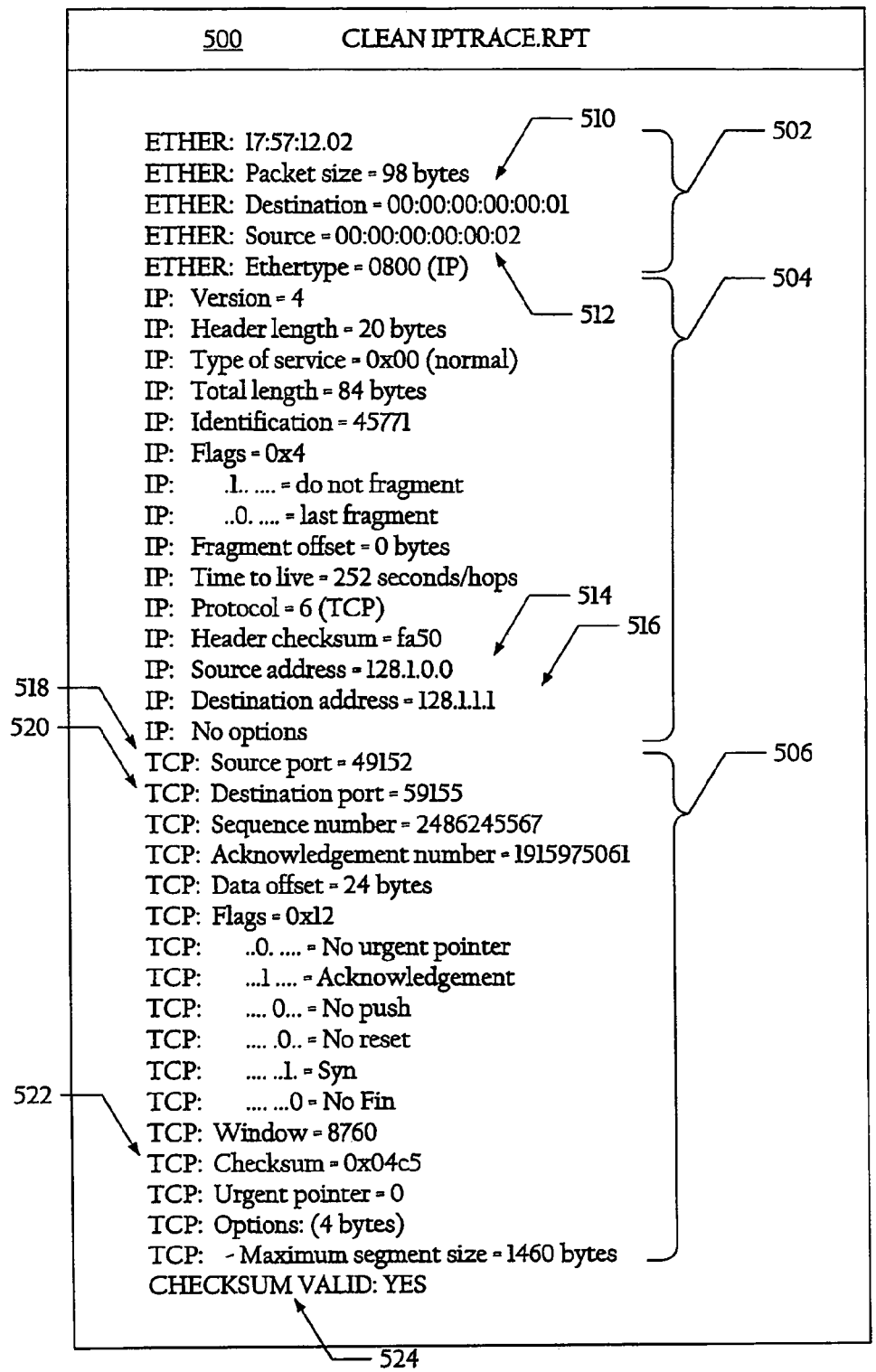
FIG. 5 depicts exemplary connection monitor data process output according to an embodiment of the present invention.

Utilizing one or more embodiments of the present invention, connection monitor data process input such as has been illustrated in FIG. 3 may be processed to remove or extract packet data as well as to substitute or translate metadata specifying network element addresses. FIG. 5 depicts exemplary connection monitor data process output according to an embodiment of the present invention. IP trace connection monitor data of FIG. 5 is illustrated as being embodied within an iptrace daemon report file 500 "CLEAN IPTRACE.RPT" generated by applying a process or method embodiment of the present invention to connection monitor data process input (e.g., iptrace daemon report file 300 "IPTRACE.RPT" depicted in FIG. 3).

Report file 500 as depicted in FIG. 5 includes data link layer connection monitor data 502 (e.g., Ethernet data), network layer connection monitor data 504 (e.g., IP data), and transport layer connection monitor data 506 (e.g., TCP data) corresponding to the categories of connection monitor data shown in FIG. 3. However, following processing according to an embodiment of the present invention, the connection monitor data stored within report file 500 includes substitute network element addresses e.g., destination (510) and source (512) hardware or media access control addresses, source (514) and destination (516) IP addresses, and source (518) and destination (520) ports in place of the original corresponding address and port metadata. Moreover, the depicted connection monitor (i.e., "trace" or packet) data includes additional checksum data (e.g., checksum valid indicator 524) generated prior to the removal or extraction of user data (e.g., user data 308 of FIG. 3).

Figure 6:
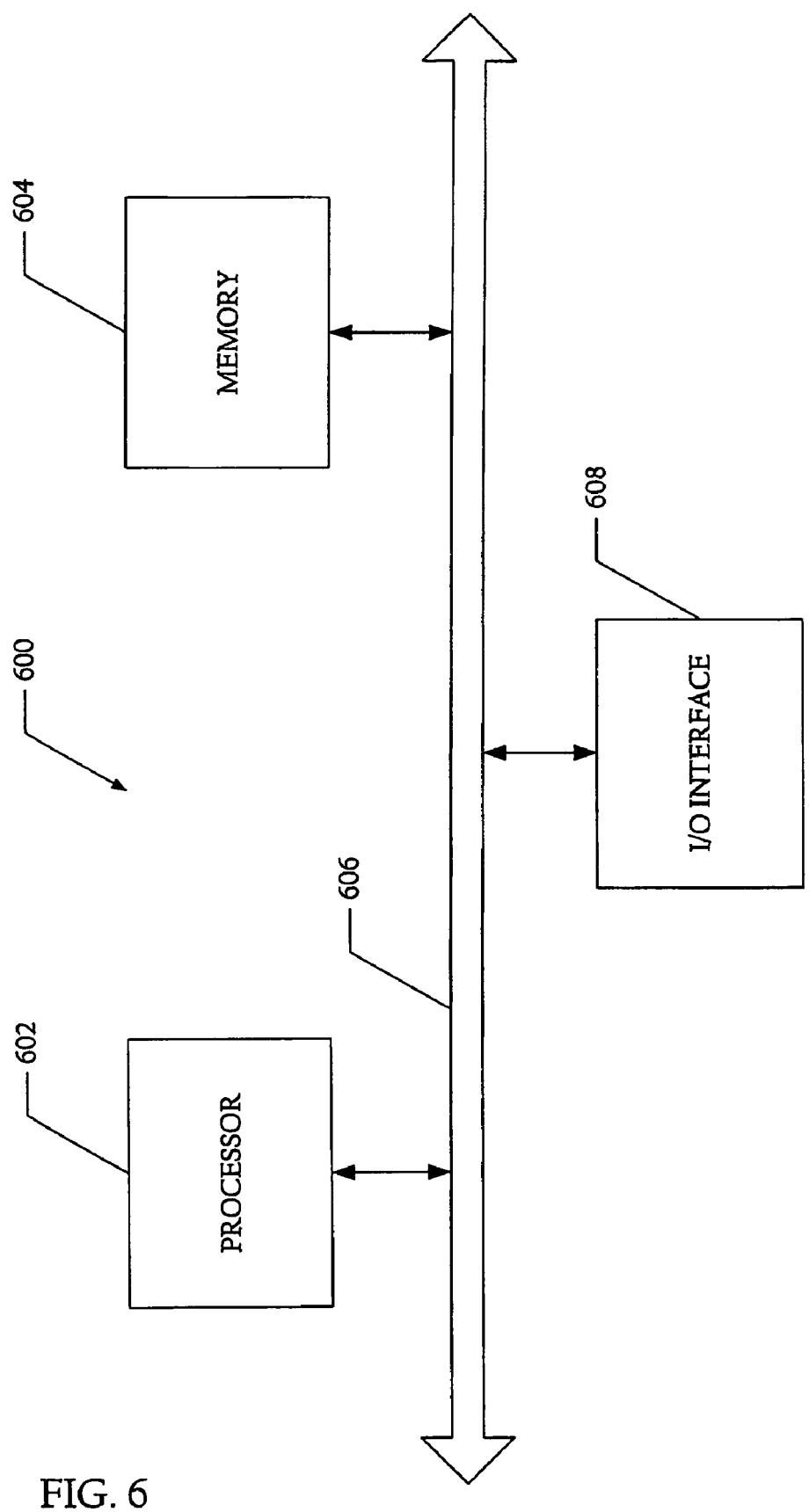
FIG. 6 illustrates a high-level internal block diagram of a data processing system useable with one or more embodiments of the present invention.

FIG. 6 illustrates a high-level internal block diagram of a data processing system useable with one or more embodiments of the present invention. While a particular number and arrangement of elements has been illustrated with respect to data processing system 600 of FIG. 6, it should be appreciated that embodiments of the present invention are not limited to data processing systems having any particular number, type, or arrangement of components and so may encompass a wide variety of data processing system types, architectures, and form factors (e.g., network elements or nodes, personal computers, workstations, servers, or the like). Data processing system 600 of the illustrated embodiment includes a processor 602 coupled to a memory 604 using a communication medium (e.g., bus 606). Memory 604 may comprise any of a number of system memory-type storage elements such as random access memory (RAM), read-only memory (ROM), flash memory, and cache.

Data processing system 600 of the illustrated embodiment further comprises an input/output (I/O) interface 608 coupled to bus 606 to communicatively couple one or more I/O devices (not shown) to data processing system 600. Exemplary I/O devices may include traditional I/O devices such as keyboards, displays, printers, cursor control devices (e.g., trackballs, mice, tablets, etc.), speakers, and microphones; storage devices such as fixed or "hard" magnetic media storage devices, optical storage devices (e.g., CD or DVD ROMs), solid state storage devices (e.g., USB, Secure Digital SD™, CompactFlash™, MMC, or the like), removable magnetic medium storage devices such as floppy disks and tape, or other storage devices or mediums; and wired or wireless communication devices or media (e.g., communication networks accessed via modem or direct network interface). Although a single I/O interface 608 has been depicted in data processing system 600, additional I/O interfaces, each coupled to one or more exemplary I/O devices may be included.

Embodiments of the present invention may include software, information processing hardware, and various processing operations further described herein. The features and process operations of the present invention may be embodied in executable instructions embodied within a machine-readable medium such as memory 604, a storage device, a communication device or medium, or the like. A machine-readable medium may include any mechanism that provides (i.e., stores and/or transmits) data in a form readable by a machine (e.g., data processing system 600). For example, a machine-readable medium may include but is not limited to: random access memory (RAM); read only memory (ROM); magnetic storage media; optical storage media; flash memory devices; or the like. The described executable instructions can be used to cause a general or special purpose processor such as processor 602, programmed with the instructions, to perform operations, methods or processes of the present invention. Alternatively, the features or operations of the present invention may be performed by specific hardware components that contain hard-wired logic for performing such operations, or by any combination of programmed data processing components and custom hardware components.

Although the present invention has been described in the context of fully functional data processing system those skilled in the art will appreciate that the present invention is capable of being distributed as a program product in a variety of forms and of being applied equally, regardless of the particular type of computer-readable media. Examples of computer-readable media include recordable media such as floppy disks and CD-ROM, as well as media storage and distribution systems. Embodiments of the present invention may similarly be implemented using software modules used to perform certain operations or tasks. The described software modules may include script, batch, library, or other executable files and may be stored on a machine- or computer-readable medium. Thus, the modules may be stored within a computer system memory to configure a data processing or computer system to perform one or more functions of a software module. Various types of machine or computer-readable storage media may be used to store the modules discussed herein.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Consequently, the invention is intended to be limited only by the scope of the appended claims, giving full cognizance to equivalents in all respects.

What is claimed is:

1. A method of securely maintaining communications network connection data, said method comprising:
    prompting a user for network element address substitution data which specifies a substitute network element address for a network element address associated with a network element of a first communications network;
    causing said network element address substitution data to be stored within a first storage element, wherein access to said first storage element outside of said first communications network is restricted;
    processing connection monitor data associated with said first communications network utilizing said network element address substitution data, wherein said processing includes
        identifying metadata of said connection monitor data which specifies said network element address, and
        substituting said metadata of said connection monitor data which specifies said network element address with metadata which specifies said substitute network element address in response to an identification of said metadata of said connection monitor data;
    generating checksum data utilizing said communications network packet;
    appending said checksum data to said connection monitor data in response to a generation of said checksum data;
    extracting data of said connection monitor data; wherein said extracting step includes extracting data from a communications network packet of said connection monitor data, and extracting said data of said communications network packet in response to said generation of said checksum data; and
    transmitting said connection monitor data to a second storage element in response to a substitution of said metadata of said connection monitor data with said metadata which specifies said substitute network element address; wherein said second storage element is physically separate from said first communications network and wherein said transmitting step includes transmitting said connection monitor data to said second storage element in response to an extraction of said data of said connection monitor data.

* * * * *